May 28, 1968     E. F. HOLLANDER, SR     3,385,510

MINIATURE MOTOR DRIVEN AIR BLOWER

Filed July 29, 1966

INVENTOR
EDWARD F. HOLLANDER, SR

BY *Alfred B. Levine*

ATTORNEY

United States Patent Office 3,385,510
Patented May 28, 1968

3,385,510
MINIATURE MOTOR DRIVEN AIR BLOWER
Edward F. Hollander, Jr., Broomall, Pa., assignor to Litton Precision Products, Inc., Clifton Heights, Pa., a corporation of Delaware
Filed July 29, 1966, Ser. No. 568,790
5 Claims. (Cl. 230—117)

ABSTRACT OF THE DISCLOSURE

A high speed vibration free motor in which the rotor is restrained from any movement with respect to the stator except relative rotation by the combined interacting features of spring stressing the bearings and providing a resilient support of the stator, whereby spurious forces acting on the rotor are transmitted through the stator to be absorbed in the resilient support.

Figure 2:
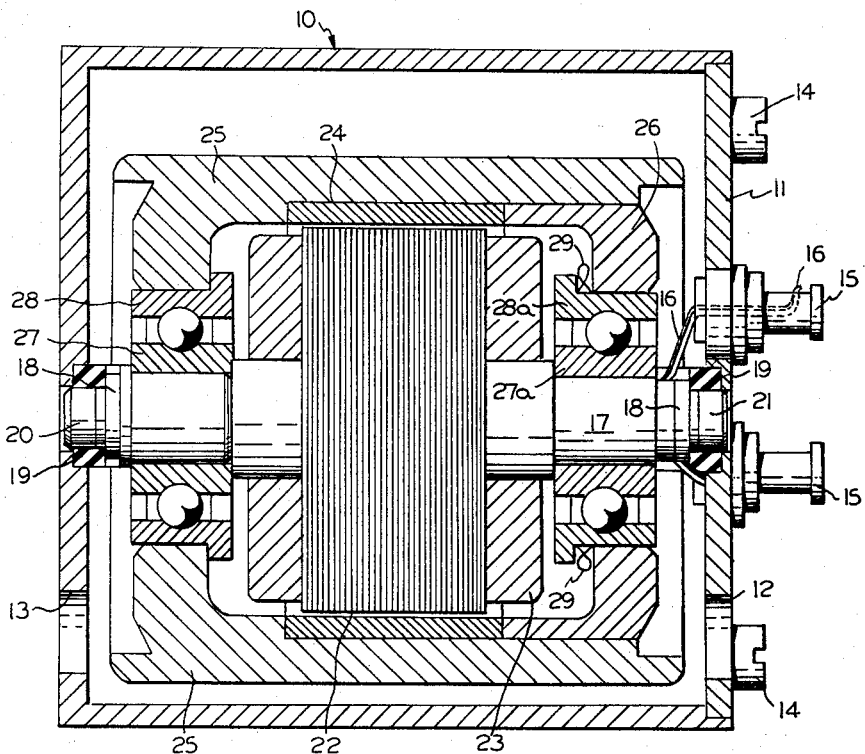

This invention relates to improvements in electric motors and is particularly concerned with improved miniature electric motors for use in high speed air blowers, although the invention is not limited to such applications.

In the past miniature high speed motor driven air blowers have been extensively used for cooling electronic equipment. To provide a relatively large cooling capacity within a small size blower unit, such motors are required to operate at very high speeds in the range of 20,000 revolutions per minute. At these high speeds the air blowers heretofore constructed have produced considerable vibration due to play in the tiny anti-friction bearings which vibration, in turn, has progressively produced unequal wear in the bearings leading to more play and more pronounced vibration, thereby very rapidly causing complete failure of the bearings and motor.

Various conventional techniques for minimizing these vibrations and correspondingly extending the life of the motor have been attempted with little success and, in fact, one of the leading maunfacturers of such air blowers presently advertises such miniature blowers as being useful for applications where such vibration is desirable thereby seemingly admitting its inability to correct for this vibration problem.

According to the present invention there is provided an improved electric motor of this type having a comparatively simple and inexpensive manner of correcting for this vibration. In a preferred embodiment this is performed by two conjointly operating changes in the construction of the motor. The first change involves resiliently supporting the stator structure by means of resilient bushings to absorb and cushion any vibrations resulting from unequal mass distributions, and the second change involves subjecting the bearings to an axially directed compressive or tension force exerted in a novel manner between the stator and rotor members. This latter force compels the bearings to wear evenly as the rotor spins at high rotative speeds and additionally rigidizes the spinning rotor and stator with respect to any axial play and vibrations compelling the rotor and stator together to experience any such motions which are then damped by the resilient bushings.

It is accordingly a principal object of the invention to provide an improved high speed motor and air blower in which vibration due to unbalanced masses and play in the bearings are materially minimized.

A further object is to provide such a motor having a considerably longer operating life cycle than heretofore.

Another object is to provide a unitized motor driven air blower unit that transmits considerably less vibrations through its supporting structure.

A still further object is to provide such a unit that is comparable or less in cost than prior units of the same kind yet provides a considerably longer operating life and less vibration.

Figure 1:
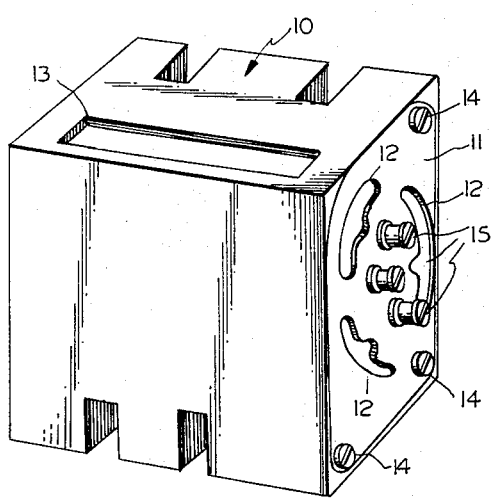

Other objects and additional advantages will be more readily understood by those skilled in the art after a detailed consideration of the following specification taken with the accompanying drawing wherein:

FIG. 1 is a perspective view showing the outer housing of a miniature electric motor driven air blower according to the invention, and FIG. 2 is an enlarged cross-section view through the housing of FIG. 1 and showing the improved construction of the motor and fan blades.

Referring to the drawings there is shown one preferred construction of a miniature air blower according to the invention. As shown in FIG. 1, the housing 10 is in the form of a small rectangular enclosure having an air outlet slot or slots 13 on its upper side and air intake slots 12 provided in a cover 11 on the face, together with a series of projecting electrical terminals 15 for applying energization to the motor inside the housing. As will be seen, the cover 11 is removable from the housing to permit the initial mounting and assembly of the motor having impellers inside the housing as well as access thereto later on, and the cover 11 is fastened to the housing by means of screws 14 as shown.

As shown in FIG. 2, within the hollow housing 10 is provided a central shaft 17 whose opposite ends 20 and 21 are supported by the rear wall of the housing and the cover plate 11, respectively. The shaft 17 is stepped or varied in diameter along its length, as shown, and on the central portion is rigidly supported the stator of the motor comprising a series of stacked laminations 22 of conventional stamped metal construction through the slots of which are wound the stator coils or windings 23. The shaft 17 may be hollow, or suitable openings provided therein, to contain the electrical leads or wiring 16 for energizing the stator coils, with the other ends of these wires 16 being directed from the shaft to the electrical terminals 15 in the end plate 11.

The rotor member 25 of the motor is constructed in the general form of a hollow cylinder that is concentrically disposed about the outside of the stator 22 to provide what is generally known as an inside-out hysteresis motor. The ends of the rotor are rotatably supported on the central shaft by means of antifriction bearings, having inner races 27 and 27a that are press fitted onto reduced diameter portions of the shaft 17 and outer races 28 and 28a fitted to the radially inwardly directed end portions of the rotor.

In the preferred construction of the blower, the rotor is a composite member comprised of a main portion 25 of metal that is cast in generally cylindrical form and having a series of impeller or fan blades integrally formed therewith and projecting radially outward from its outer surface. A central hysteresis ring 24 is press fitted to the inside of this cylinder and located concentrically about the stator laminations 22, and a shaped bearing support ring 26 at the other end is press fitted onto the inner surface of the impeller cylinder 25 to rigidly sandwich the hysteresis ring 24 between shoulders of the impeller and the bearing support ring 26, as shown. After assembly these three members may be welded or otherwise fastened together to form a rigid unit should this be necessary to supplement the press fitted connection.

As is believed evident to those skilled in this art, this construction of the outside rotor provides a high moment of inertia of the rotor enabling a more constant speed of rotation despite the turbulent forces of the air flow reacting on the radially projecting impeller blades. However at the same time, these turbulent air produced forces acting on the impeller blades in all directions tend to accentuate and amplify undesired axial vibrations of the rotor resulting from even a small amount of play or looseness in the miniature bearings. As a result, these vibrations progressively cause unequal wear in the bearings, thereby increasing the play in the bearings and progressively increasing the vibrations, and consequently rapidly causing failure of the motor due to the bearings failing or due to the rotor becoming so misaligned that the impeller blades strike the inside walls of the housing. According to the present invention, it has been discovered that by correcting for this play in the bearings and resiliently supporting the central shaft, that these vibrations are very markedly reduced and the operating life cycle of the blower before failure is extended many times over that of a blower that is not compensated in this manner.

To remove or materially diminish the play in the bearings, a spring steel washer 29 is provided between the downwardly directed shoulder 26 on the bearing ring 26 and the shoulder on the outer race 28a of the right hand antifriction bearing. Since the opposite end of the rotor bears against the shoulder of the outer race 28 of the bearing on the left hand side, and since the rotor is a rigidized member, this spring 29 provides an axially directed force, that is parallel to the axis of the shaft 17 and therefore operates in a direction to pull the outer races of the two bearings together. The inner races of these bearings however cannot move toward each other in response to this compressive force, since they are restrained by the raised shoulders of the stepped portion of the central shaft 17. Consequently the result of using this spring washer 29 is to axially stress each of the outer races 28 and 28a of the bearings with respect to the inner races 27 and 27a and therefore minimize any play in both bearings. By this prestressing of the bearings, the rotor is essentially rigidized with respect to the central shaft 17, except for rotative movement. Consequently any axial or other than rotatively directed forces acting on the impeller blades are transmitted through the bearings to the central shaft 17.

If the central shaft 17 were rigidly fastened to the housing 10, these forces would react upon the bearings and result in stresses and wear. However according to the invention, the shaft 17 is resiliently supported by the housing 10 by employing resilient bushings 19 of "Teflon," "nylon" or the like. Consequently all of such forces, except for rotative forces, are directed to the resilient bushings 19 where the energy is absorbed, thereby relieving the stresses on the bearings. As a result of these two changes in construction, it has been found that the vibrations of the miniature blower have been very markedly reduced greatly increasing its applicability to many applications where it could not be formerly used and that the operating life of the blower has been correspondingly extended.

Although but one preferred embodiment of the invention has been illustrated and described many changes may be made by those skilled in this art, and accordingly this invention should be considered as limited only by the following claims:

What is claimed is:

1. A substantially vibration free motor comprising: a housing, a stator supported by the housing, a rotor rotatably supported with respect to the stator by bearings, means for prestressing the bearings to minimize any relative movement between the rotor and stator except rotation, and a resilient mounting for supporting the stator with respect to the housing, whereby spurious forces acting on the rotor do not result in relative movement between the rotor and stator but are transmitted through the prestressed bearings and stator to be absorbed in the resilient mounting.

2. In the motor of claim 1, said rotor being of substantially hollow cylindrical construction and enclosing said stator, and having an antifriction bearing near opposite ends thereof to rotatably support the rotor on said shaft, a plurality of impeller blades disposed substantially radially outwardly from the rotor, and said housing enclosing said motor and having inlet and outlet openings for drawing in and exhausting air and chamber formed therein for reacting the impeller blades with the air.

3. A high speed motor driven air blower comprising: a housing providing a chamber and having openings for the intake and expulsion of air, a hollow cylindrical rotor rotatably supported on a shaft within said housing, a stator rigidly supported on the shaft inside said hollow rotor, resilient means coupling said shaft to the housing, antifriction bearings supporting said rotor on the shaft and having an inner race, outer race and roller members between said races, means for prestressing said inner race with respect to the outer race along an axis parallel to the rotative axis of said bearings, and impeller blades extending substantially radially outwardly from the outside of said rotor.

4. In the blower of claim 3, said stressing means comprising a spring means exerting an axial force between said rotor and outer race of the bearings, said inner race being immovably supported on said shaft.

5. In the blower of claim 3, said resilient means comprising a resilient bushing supporting each end of the shaft in said housing.

References Cited

UNITED STATES PATENTS

| | | | |
|---|---|---|---|
| 2,772,046 | 11/1956 | Shomphe | 230—117 |
| 2,776,088 | 1/1957 | Wentling | 230—117 |
| 2,854,188 | 9/1958 | Shomphe | 230—117 |
| 918,600 | 4/1909 | Schacht | 308—184 |
| 2,571,267 | 10/1951 | Ljunggren | 308—184 |
| 3,214,224 | 10/1965 | Lash | 308—189.1 |

HENRY F. RADUAZO, *Primary Examiner.*